2,790,012

DEODORIZATION OF BENZENE HEXACHLORIDE

Roy E. Dunn, William B. Grandjean, and Frank L. Padgitt, Baton Rouge, La., assignors to Ethyl Corporation, New York, N. Y., a corporation of Delaware No Drawing. Application February 5, 1954,
Serial No. 408,614

5 Claims. (Cl. 260—648)

This invention relates to the treatment of benzene hexachloride and more particularly to the deodorization of the gamma isomer of benzene hexachloride or mixtures containing a high concentration thereof.

The insecticidal activity and commercial value of gamma benzene hexachloride or isomer mixtures containing the same is well known. This isomer is produced commercially by the photochlorination of benzene and is obtained as a mixture with several other steric isomers. In addition, the crude isomer mixture also contains various by-products, particularly heptachlorocyclohexanes, octachlorocyclohexanes, and tetrachlorocyclohexane. The gamma isomer itself apparently has no odor, but the crude benzene hexachloride mixture has a strong, musty, disagreeable odor, probably associated with one or more of the non-benzene hexachloride impurities.

Present separation and purification techniques for recovering pure gamma isomer do not elminate these odor bodies from the product. In the conventional method of extracting the gamma isomer from crude mixtures with a selective solvent, such as methanol, and crystallizing a high gamma isomer product, the product after even two recrystallizations has a relatively strong disagreeable odor and is accordingly unsuitable for commercial use as lindane (99 percent gamma isomer and odorless).

Several treatments have been suggested for deodorization of the crude mixture, including steam distillation, fractional distillation of the mixture under vacuum, boiling with oil, nitric acid, alkalies, etc. and many other techniques. These methods do not produce odor-free gamma isomer products, even when combined with gamma concentration techniques.

It is accordingly an object of the present invention to provide an improved method for deodorizing high gamma isomer benzene hexachloride products. Another object is to provide a convenient, simple and economical means for deodorizing such products. Still another object is to provide a method of the above type which can be readily combined with present processes for purification of the gamma isomer without requiring additional process steps. Other objects and advantages of the present invention will become apparent from the following description and appended claims.

It has now been found that benezene hexachloride compositions which contain principally the gamma isomer can be effectively deodorized by adding a quantity of water to a solution of the benzene hexachloride composition in order to precipitate essentially all or a part of the solids from the solution, the latter product being thereafter separated from the aqueous solution. The dried product obtained therefrom does not have a disagreeable, benzene hexachloride odor and under preferred process conditions is completely odor-free.

The preferred embodiment of the process of this invention comprises precipitating gradually the benzene hexachloride composition containing above about 80 percent and preferably above about 95 percent of the gamma isomer from a hot solution by the addition of water thereto over an extended period of time and, simultaneously cooling the solution to a temperature below about 35° C. In general, the quantity of water added can be between about 5–50 percent, based on the solvent in the solution, but preferably the total water employed is between about 15–30 percent of the solvent. Best results have been obtained when the solution is initially at an elevated temperature, above about 40° C. and preferably above about 60–65° C.

The period of cooling does not materially effect the deodorization of the benzene hexachloride. However, the time of beginning cooling is critical and, if the solution is initially at a temperature of above about 50–60° C., cooling must commence within a relatively short period of time, i. e. before about 15–30 minutes. Although this is surprising and is not completely understood, if the solution is maintained for an extended period (above about 1 hour) at an elevated temperature, following the addition of water thereto, no appreciable improvement in odor is obtained. At the same time, however, water can be added to cool the hot solution to about 30° C. over a period of 15 minutes or over a period of two hours without an appreciable difference in the odor levels of the products.

The water precipitated gamma benzene hexachloride product, following separation from the water-solvent mother liquor, is generally washed with fresh solvent or with water. Although it is unexpected, separate washes with both solvent and water give better results than a plurality of washes with either.

The following are typical examples of the process of this invention but these examples are not to be construed as in any way limiting the invention. All quantities given in the following examples are in parts by weight.

Evaluation of the products of the following examples with respect to odor level has been conducted by submitting a masked sample of the product to a panel of about 10 persons, the results being a consensus of opinion of this panel.

Example I

A benzene hexachloride-methanol solution containing 200 parts of a 96 percent gamma isomer material and 1,000 parts of anhydrous methanol was heated to its reflux temperature (65–67° C.). Water was continuously added to this solution and the solution was cooled to a final temperature of 30° C. over a period of two hours. The slurry so formed was filtered at 30° C. and the cake was successively washed with 190 parts of anhydrous methanol and 380 parts of water. The washed cake was thereafter air dried at room temperature and again dried in an oven maintained at 40° C. A sample of the dried cake was submitted to the test panel discussed above and was found to be completely free of the characteristic benzene hexachloride odor.

Example II

A control comparative test was carried out identical to Example I above except that no water was added to the methanol solution and sufficient methanol was removed to precipitate a quantity of gamma isomer product. The concentrated solution was cooled in a similar period. The final solution contained three parts of methanol to 1 part of benzene hexachloride. This cake was washed similarly to the test above and, even though smaller quantities were precipitated (about ⅔ of Example I), the dried cake had a higher odor level and did not compare in quality to the product obtained by the water precipitation of Example I.

Example III

This example demonstrates that additional methanol washes do not eliminate or appreciably improve the odor level of the gamma isomer product. Example II is repeated except that two methanol washes are employed in addition to the one water wash. The dried product from this example has a disagreeable odor similar to the product of Example II and does not compare favorably with the product of Example I.

Example IV

Example I is repeated except that a benzene hexachloride material containing only 40 percent of the gamma isomer is employed instead of the 96 percent gamma isomer material. This material is obtained by extracting crude benzene hexachloride. The remaining isomers are essentially alpha, delta and the by-product compounds formed with the benzene hexachloride. The dried cake, following precipitation with water and washing with both cold methanol and water, has a strong characteristic benzene hexachloride odor, making the same entirely unsuitable for commercial use as a lindane product.

Example V

This example demonstrates the effect the time of precipitation has on deodorization. Example I was repeated except that the water was added and precipitation occurred over a shorter period of time. In this example, the period of water addition and cooling was 15 minutes and the final temperature was 30° C. The dried product was completely free of the characteristic benzene hexachloride odor, although the crystal size was extremely small in comparison with the crystals of Example I.

Example VI

This example demonstrates deodorization of a relatively low gamma isomer material by the process of this invention. Example I was repeated except that the benzene hexachloride product contained only 85 percent gamma isomer; only 5 percent water was added to the methanol solution, based on the weight of the methanol; and 2000 parts of methanol were employed instead of 1000, as in Example I. The product did not exhibit a characteristic benzene hexachloride odor, although there was a slight odor which distinguished it from the odor-free product of Example I.

Example VII

Example I was repeated except that even a higher purity gamma isomer material (99 percent) was deodorized from a solution containing 5 parts of methanol per part of benzene hexachloride. A high percentage of water (45 percent based upon the weight of the methanol) was added to the solution over a two hour period. The dried product was odor-free. The crystals obtained, however, were smaller than those obtained in Example I.

Example VIII

This is a comparative example illustrating the undesirability of precipitating the product only at elevated temperatures. Example I was repeated except that the solution was not permitted to cool but instead was crystallized for one hour essentially at the reflux temperature. Following washing with both methanol and water, the dried crystals contained a characteristic benzene hexachloride odor of a relatively high odor level and was materially inferior to the product obtained in Example I.

Example IX

Example VIII was repeated except that all of the water was added at 65° C. and the solution was maintained at this temperature for one hour. Thereafter, the solution was cooled to a temperature of 30° C. to precipitate additional quantities of the benzene hexachloride. The dried product, following washing in accordance with Example I, had a strong characteristic odor of benzene hexachloride and did not compare with the quality of the product of Example I.

Example X

Example I was repeated except that the water is added to the solution at 30° C. without subsequent cooling. Although the yield of product is materially lower than Example I, the product obtained is essentially odor-free.

When benzene hexachloride compositions dissolved in other solvents are treated in accordance with this invention, similar results are obtained. For example, with solutions in ethanol, isopropanol, glycol, dimethyl ketone, methyl ethyl ketone, and diethyl ketone, corresponding odor-free products are obtained upon precipitation of the benzene hexachloride from the solutions with water.

Although, as pointed out above, the period of precipitation does not appreciably alter the odor level of the product, it has a material effect on the crystal size and form of the lindane product. Longer periods of water addition and cooling tend to give larger crystals, which in turn are easier to handle and process and are more desirable commercially. Generally, this period is between about ½ to 5 hours and preferably between about 1–3 hours.

The solvents which can be employed in this invention are alcohols and ketones. Included in the alcohols are the poly hydroxy aliphatic compounds such as the glycols and glycerine. The most preferred solvents are lower aliphatic alcohols including methanol, ethanol, normal propanol, iso propanol, normal butanol and iso butanol. The most preferred poly alcohols are ethylene glycol and diethylene glycol. Typical examples of suitable ketones are dimethyl ketone, methyl ethyl ketone, diethyl ketone, methyl iso butyl ketone, di iso propyl ketone, di butyl ketone, etc.

As is believed apparent from the foregoing, the present invention provides a convenient and economical means of deodorizing high gamma isomer benzene hexachloride compositions by precipitating the composition from solutions containing the same by the addition of a quantity of water. The process can be readily combined with presently employed processes without the necessity of separate process steps. Thus, in a process involving the extraction of crude benzene hexachloride with a selective solvent and crystallization of a high gamma isomer product therefrom, it is normally necessary to recrystallize this high gamma isomer product at least once and generally twice to produce an essentially pure product in respectable yields. The water precipitation deodorization process of this invention can be substituted for either or both of these recrystallizations with the result that both deodorization and purification is accomplished in a single operation.

We claim:

1. A process for deodorizing benzene hexachloride compositions containing above about 80 percent of the gamma isomer, based upon the weight of said benzene hexachloride, comprising adding a quantity of water to a solution of the benzene hexachloride composition, the solvent of said solution being selected from the group consisting of lower aliphatic alcohols, ethylene glycol, diethylene glycol, dimethyl ketone, methylethyl ketone, diethyl ketone, methyl isobutyl ketone, di-isobutyl ketone, and dibutyl ketone; the solution being at a temperature above about 40° C. and the quantity of water being between about 5–50 percent, based on the weight of solvent in the solution; immediately but gradually cooling said solution to a temperature below about 35° C. to precipitate an essentially odor-free product; and separating the precipitated product from the aqueous solution.

2. The process of claim 1 wherein the benzene hexachloride is dissolved in a lower aliphatic alcohol.

3. The process of claim 2 wherein the lower aliphatic is methanol.

4. A process for deodorizing benzene hexachloride compositions containing above about 80 percent of the gamma isomer, based upon the weight of said benzene hexachloride, comprising adding a quantity of water to a solution of the benzene hexachloride composition, the solvent of said solution being selected from the group consisting of lower aliphatic alcohols, ethylene glycol, diethylene glycol, dimethyl ketone, methyl ethyl ketone, diethyl ketone, methyl isobutyl ketone, di-isopropyl ketone, and dibutyl ketone; the solution being at a temperature above about 40° C. and the quantity of water being between about 5–50 percent, based upon the weight of solvent in the solution; gradually cooling said solution to a temperature below about 35° C. to precipitate an essentially odor-free product; said cooling commencing in a period not greater than 30 minutes after addition of water to the solution; and separating the precipitated product from the aqueous solution.

5. The process of claim 4 in which the precipitated product is separately washed with methanol and water.

References Cited in the file of this patent

UNITED STATES PATENTS 2,438,900    Cooke et al. _____ Apr. 6, 1948